Patented Feb. 28, 1939

2,148,705

UNITED STATES PATENT OFFICE 2,148,705

AZO COMPOUNDS

Fritz Mietzsch and Josef Klarer, Wuppertal-Elberfeld, Germany, assignors to Winthrop Chemical Company, Inc., New York, N. Y., a corporation of New York No Drawing. Application July 26, 1935, Serial No. 33,415. In Germany December 24, 1932

11 Claims. (Cl. 260—155)

This invention relates to azo compounds which display a bactericidal action, and to a process of preparing the same.

In accordance with the present invention azo compounds displaying a bactericidal action are obtainable by the manufacture of the compounds of the general formula: $R^1-N=N-R^2$, wherein $R^1$ stands for a para-sulfamide or disulfamide substituted phenyl radical, and $R^2$ stands for a cyclic radical containing nitrogen in basic linkage, that is for a pyridine, quinoline or isoquinoline radical, which contains at least one further basic nitrogen atom in the form of an amino or alkylamino group, or contains at least one hydroxyl group. In the new azo compounds the amino group of the sulfamide group may be a primary, secondary or tertiary amino group. It may, for instance, be substituted by saturated or unsaturated alkyl or cycloalkyl groups, such as methyl, ethyl, allyl, butyl, isoamyl, cyclohexenyl, or by aralkyl groups, such as benzyl and phenylethyl. The two hydrogen atoms of the amino group may also be replaced by an alkylene group in which case the nitrogen atom of the sulfamide group forms a hydrogenated heterocyclic ring system with the alkylene group, for instance, a pyrrolidyl or piperidyl ring. The new compounds may contain in the pyridine quinoline or isoquinoline radical besides the above specified characteristic groups other substituents, such as alkyl, halogen, hydroxyl, alkoxy, phenoxy and the nitro group, but free acid groups should not be present. The amino groups attached to the heterocyclic nucleus of the azo compounds may be substituted, for instance, by alkyl groups.

In accordance with the present invention the azo compounds of the kind specified are obtainable by reacting upon a pyridine, quinoline or isoquinoline compound which contains at least one further nitrogen atom in the form of an amino or alkylamino group, or at least one hydroxyl group with a parasulfamide or a disulfamide diazo phenyl compound, whereby the heterocyclic components may be further substituted in the manner above indicated. The reaction is advantageously carried out in the presence of water at a low temperature, say at about 20° C. or below. The azo compounds thus obtainable are colored powders which are insoluble in water but form, if they contain amino groups, with mineral acids, such as hydrochloric, hydrobromic and sulfuric acid, salts which dissolve more or less in water. The azo compounds which contain attached to the heterocyclic nucleus hydroxyl groups or contain a hydrogen atom at the amino group or the sulfamide group may also be dissolved in caustic alkalies. In view of their remarkable bactericidal action particularly against streptococci infections of warmblooded animals and new compounds have proved active in the treatment of infectious diseases.

The invention is further illustrated by the following examples without being restricted thereto:

*Example 1.*—20.8 grams of the hydrochloride of 4-aminobenzenesulfonoamide are diazotized with 6.9 grams of sodium nitrite and treated with 10.9 grams of alpha-alpha'-diaminopyridine, dissolved in hydrochloric acid. After some stirring sodium acetate is added and the mixture is left standing until the coupling reaction is complete. The solution is rendered alkaline by means of ammonia, filtered with suction, washed out and the free base after dissolving in methyl alcohol is converted with hydrochloric acid into the hydrochloride of 4'-sulfonoamidebenzeneazo-alpha-alpha'-diaminopyridine which forms red brown prisms melting at 266° C. The compound is sparingly soluble in water, it is readily soluble in caustic alkalies with an orange coloration. It has the following formula:

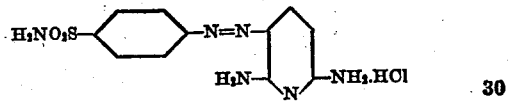

In an analogous manner the hydrochloride of 4'-sulfonodimethylamide-benzene-azo-alpha-alpha'-diaminopyridine is obtained in the form of brick red crystals melting at 233° C., further the hydrochloride of 4'-sulfonoamide-benzene-azo-alpha-alpha'-hydroxyaminopyridine in the form of light red crystals melting at 268° C. while decomposing the 4'-sulfono-monomethylamide-benzene-azo-alpha-alpha'-diamino-pyridine in the form of brick red bright crystals melting at 214° C. and the 4'-sulfono-di-(hydroxyethyl)-amide-benzene- azo- alpha-alpha'-diamino-pyridine in the form of yellow red crystals melting at 195° C. The latter has the formula:

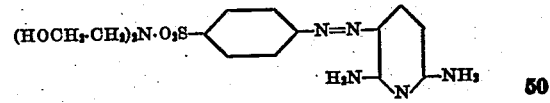

*Example 2.*—20.8 grams of the hydrochloride of 4-aminobenzene-sulfonoamide are diazotized and mixed with 14.4 grams of 6-aminoquinoline, dissolved in acetic acid. After the addition of sodium acetate the 4'-sulfonoamide-benzeneazo-6-aminoquinoline of the formula

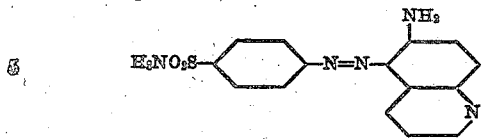

is precipitated. The hydrochloride of the latter is obtained in the form of brick red crystals melting at 271° C. (from alcohol).

In an analogous manner there are obtained the azo compounds of diazotized 4-aminobenzenesulfonoamide and 6-ethylaminoquinoline, the base melting at 124° C., 6-iso-octylaminoquinoline, the base melting at 183° C., 6-dodecylaminoquinoline the base melting at 126° C., 6-amino-8-methylquinoline melting point of the hydrochloride above 300° C., 7-ethyl-aminoquinoline, melting point of the hydrochloride 180° C., 7-butylaminoquinoline, melting point of the hydrochloride 178° C., 8-aminoquinoline, melting point of the hydrochloride 212° C., 6-methyl- and 6-methoxy-8-aminoquinoline, melting points of the hydrochlorides above 300° C., 5-aminoquinoline, melting point of the hydrochloride 192° C., 6-hydroxy-8-aminoquinoline, melting point of the hydrochloride 370° C. (with decomposition), 5-amino-isoquinoline, melting point of the hydrochloride 218° C.; further, the azo compounds of diazotized 4-aminobenzene-sulfonodimethylamide and 6-aminoquinoline, melting point of the hydrochloride 258° C., the azo compound of 4-aminobenzenesulfonocyclohexylamide and 6-aminoquinoline, melting point of the free base 270° C., and the azo compound of 4-aminobenzene-sulfonopiperidide and 6-aminoquinoline, melting point of the free base 280° C. The latter has the formula:

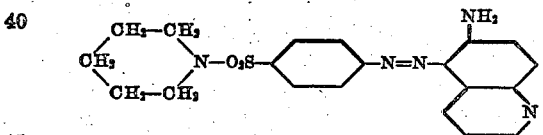

*Example 3.*—20.8 grams of the hydrochloride of 4-amino-benzene-sulfonoamide are diazotized in the customary manner and treated with 12.5 grams of 2.4-dihydroxy-picoline in excess dilute caustic soda lye. The 4'-sulfonoamide-benzene-azo-2.4-dihydroxypicoline of the formula:

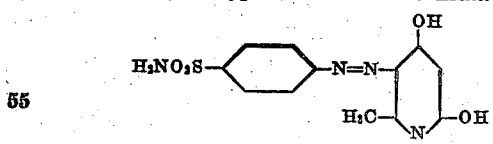

is obtained on the addition of acetic acid to the orange red colored solution as a yellow precipitate which after solution with caustic soda lye and reprecipitation with acetic acid melts at above 300° C.

In an analogous manner 3'-5'-disulfonoamide-benzene-azo-2.4-dihydroxypicoline is obtained in the form of a yellow powder melting about 300° C. when starting with the 3'-5'-disulfonoamide-diazo-benzene. It has the formula:

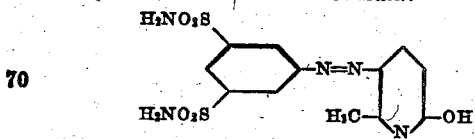

*Example 4.*—20.8 grams of the hydrochloride of 4-aminobenzenesulfonoamide are diazotized in the manner described above and caused to react with 14.5 grams of 8-hydroxyquinoline in excess dilute caustic alkali lye. From the dark solution the 4'-sulfonoamidebenzene-azo-8-hydroxyquinoline of the formula:

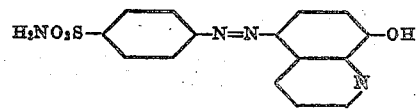

precipitates on the addition of acetic acid as a dark brown crystalline powder which after redissolving in caustic soda lye and reprecipitation with acid melts at 234° C.

In an analogous manner there are obtained the 4'-sulfonoamide-benzene-azo-5-hydroxyquinoline in the form of red brown crystals melting at 171° C. which dissolve in dilute caustic soda lye with cherry red coloration; the 4'-sulfonoamide-benzene-azo-6-hydroxyquinoline in light red crystals melting at 268° C.; the 4'-sulfonoamide-benzene-azo-7-hydroxyquinoline as light red crystal powder melting at 228° C.; the 4'-sulfonoamide-benzene-azo - 6 - chloro - 8 - hydroxyquinoline as dark brown crystal powder melting at 154° C.; the 4'-sulfonoamide-benzene-azo-5-methyl-8-hydroxyquinoline as brick red crystal powder melting at 232° C.; the 4'-sulfonoamide-benzene-azo - 8 - methyl-5-hydroxyquinoline as light red crystal powder melting at 253° C.; the 4' - sulfonoamide - benzene - azo - 6.8 - dihydroxyquinoline as brown crystal powder melting at 232° C. with decomposition; the 4'-sulfonoamide-benzene-azo - 5 - hydroxy-isoquinoline as dark brown crystalline powder melting at 232° C. with decomposition.

While we have described our improvements in great detail and with respect to preferred embodiments thereof, we do not desire to limit ourselves to such details or embodiments, since many modifications and changes may be made and the invention embodies in widely different forms without departing from the spirit or scope of the invention in its broadest aspects. Hence, we deside to cover all modifications and forms within the scope or language of any one or more of the appended claims.

Particularly we wish to point out that in the annexed claims the references to amino- and hydroxy-pyridine, quinoline or isoquinoline are intended to include also such radicals of the kind specified as contain besides the amino or hydroxyl group also other usual substituents, for instance, alkyl and alkoxy groups and halogen atoms. However, as stated above, free acid substituents should not be present.

This is a continuation in part of our copending application for Letters Patent Serial No. 702,427, filed December 14, 1933.

We claim:—

1. 4'-sulfonoamidebenzene-azo - α.α' - diaminopyridine which forms in the form of its hydrochloride red brown prisms melting at 266° C.

2. 4'- sulfonoamidebenzene-azo - α.α' - hydroxyaminopyridine which forms in the form of its hydrochloride light red crystals melting at 268° C.

3. 4'-sulfonoamidebenzene-azo-6-aminoquinoline which forms in the form of its hydrochloride bright red crystals melting at 271° C.

4. Azo compounds of the general formula:

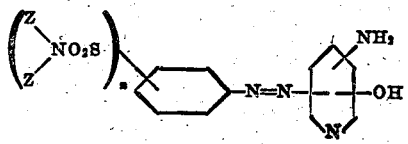

wherein the pyridine ring does not contain acid groups and the benzene ring contains no further substituents, $n$ is one of the numbers 1 and 2 and when $n=1$ the sulfamide group stands in para-position to the azo group and Z is a substituent selected from the group consisting of hydrogen, alkyl, 4- to 5-membered alkylene, mononuclear cycloalkyl, mononuclear arylalkyl, which azo compounds form water-soluble salts with mineral acids and caustic alkalies.

5. Azo compounds of the general formula:

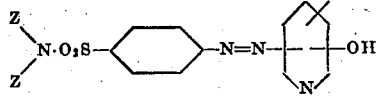

wherein the pyridine ring does not contain acid groups and the benzene ring does not contain further substituents, and Z stands for a substituent selected from the group consisting of hydrogen, alkyl, 4- to 5-membered alkylene, mononuclear cycloalkyl, mononuclear arylalkyl, which azo compounds form water-soluble salts with mineral acids and caustic alkalies.

6. Azo compounds of the general formula:

wherein the benzene ring contains no further substituents, $n$ is one of the numbers 1 and 2 and when $n=1$ the sulfamide group stands in para-position to the azo group, and Z is a substituent selected from the group consisting of hydrogen, alkyl, 4- to 5-membered alkylene, mononuclear cycloalkyl, mononuclear arylalkyl, and $R_2$ stands for a heterocyclic radical which is free from acid groups and is selected from the group consisting of amino -pyridines, -quinolines and -isoquinolines, hydroxy-pyridines, hydroxy-isoquinolines, hydroxy-quinoline, substituted hydroxy-quinolines wherein the substituents are limited to monovalent non-cyclic substituents and the corresponding N-alkylated compounds, a nuclear carbon atom of which radical is directly connected with the azo group, which azo compounds form water-soluble salts with mineral acids and caustic alkalies.

7. Azo compounds of the general formula:

wherein the benzene ring does not contain further substituents, and $R_2$ stands for a heterocyclic radical containing nitrogen in basic linkage, which heterocyclic radical is free from acid groups and selected from the group consisting of amino -pyridines, -quinolines and -isoquinolines, hydroxy-pyridines, hydroxy-isoquinolines, hydroxy-quinoline, substituted hydroxy-quinolines wherein the substituents are limited to monovalent non-cyclic substituents and the corresponding N-alkylated compounds, a nuclear carbon atom of which radical is directly connected with the azo group, and Z stands for a substituent selected from the group consisting of hydrogen, alkyl, 4- to 5-membered alkylene, mononuclear cycloalkyl, mononuclear arylalkyl, which azo compounds form water-soluble salts with mineral acids and caustic alkalies.

8. Azo compounds of the general formula:

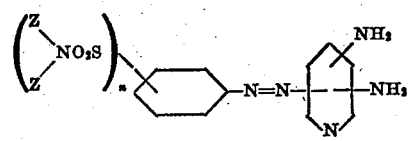

wherein the benzene ring contains no further substituents, $n$ is one of the numbers 1 and 2 and when $n=1$ the sulfamide group stands in para-position to the azo group, and Z is a substituent selected from the group consisting of hydrogen, alkyl, 4- to 5-membered alkylene, mononuclear cycloalkyl, mononuclear arylalkyl, and wherein the pyridine ring does not contain acid groups, which azo compounds form water-soluble salts with mineral acids and caustic alkalies.

9. Azo compounds of the general formula:

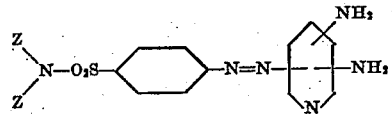

wherein the benzene ring does not contain further substituents and Z stands for a substituent selected from the group consisting of hydrogen, alkyl, 4- to 5-membered alkylene, mononuclear cycloalkyl, mononuclear arylalkyl, and wherein the pyridine ring does not contain acid groups which azo compounds form water-soluble salts with mineral acids and caustic alkalies.

10. Azo compounds of the general formula:

wherein the benzene ring contains no further substituents, $n$ is one of the numbers 1 and 2 and when $n=1$ the sulfamide group stands in para-position to the azo group, and Z is a substituent selected from the group consisting of hydrogen, alkyl, 4- to 5-membered alkylene, mononuclear cycloalkyl, mononuclear arylalkyl, and $R_2$ stands for an aminoquinoline radical which is free from acid groups and a nuclear carbon atom of which radical is directly connected with the azo group, which azo compounds form water-soluble salts with mineral acids and caustic alkalies.

11. Azo compounds of the general formula:

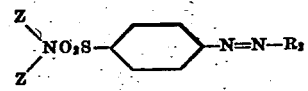

wherein the benzene ring does not contain further substituents and Z stands for a substituent selected from the group consisting of hydrogen, alkyl, 4- to 5-membered alkylene, mononuclear cycloalkyl, mononuclear arylalkyl, and $R_2$ stands for an amino-quinoline radical which is free from acid groups and a nuclear carbon atom of which radical is directly connected with the azo group, which azo compounds form water-soluble salts with mineral acids and caustic alkalies.

FRITZ MIETZSCH.
JOSEF KLARER.